(12) United States Patent
Rousseau et al.

(10) Patent No.: US 11,099,388 B2
(45) Date of Patent: Aug. 24, 2021

(54) METHOD FOR MANAGING THE DISPLAY OF AN IMAGE TO A USER OF AN OPTICAL SYSTEM

(71) Applicant: Essilor International, Charenton-le-Pont (FR)

(72) Inventors: Denis Rousseau, Charenton-le-Pont (FR); Benoit Callier, Charenton-le-Pont (FR); Marion Swital, Charenton-le-Pont (FR)

(73) Assignee: Essilor International, Charenton-le-Pont (FR)

( * ) Notice: Subject to any disclaimer, the term of this patent is extended or adjusted under 35 U.S.C. 154(b) by 0 days.

(21) Appl. No.: 16/333,928

(22) PCT Filed: Aug. 23, 2017

(86) PCT No.: PCT/EP2017/071244
§ 371 (c)(1),
(2) Date: Mar. 15, 2019

(87) PCT Pub. No.: WO2018/050416
PCT Pub. Date: Mar. 22, 2018

(65) Prior Publication Data
US 2019/0212564 A1    Jul. 11, 2019

(30) Foreign Application Priority Data
Sep. 19, 2016    (EP) .................................. 16306191

(51) Int. Cl.
*G02B 27/01* (2006.01)
*G02C 7/02* (2006.01)
*G06F 3/01* (2006.01)

(52) U.S. Cl.
CPC ..... *G02B 27/0172* (2013.01); *G02B 27/0179* (2013.01); *G02C 7/02* (2013.01);
(Continued)

(58) Field of Classification Search
CPC ....... G06F 3/011; G06F 3/013; G02B 27/017; G02B 27/0172; G02B 27/0176;
(Continued)

(56) References Cited

U.S. PATENT DOCUMENTS 5,864,380 A * 1/1999 Umeda ................. G02C 7/061
                                                351/159.42
2009/0278765 A1* 11/2009 Stringfellow .......... G02B 27/01
                                                     345/7
(Continued)

FOREIGN PATENT DOCUMENTS

EP          2 889 667 A1    7/2015
WO     WO 2014/100891 A1    7/2014

OTHER PUBLICATIONS

International Search Report dated Sep. 22, 2017, in PCT/EP2017/071244 filed Aug. 23, 2017.

*Primary Examiner* — Nathan Danielsen
(74) *Attorney, Agent, or Firm* — Oblon, McClelland, Maier & Neustadt, L.L.P.

(57) ABSTRACT

A display managing method for managing the display of an image to a user of an optical system comprising at least a see-through displaying device arranged and configured to display the image towards an eye of the user and an optical lens designed to be placed in front of the eye of the user and having an optical function. The method includes: an optical function data providing step, during which optical function data relating to the optical function of the optical lens are provided; and a display parameter determining step, during which a value of at least one display parameter is determined based at least on the optical function data.

11 Claims, 1 Drawing Sheet

(52) U.S. Cl.
CPC ........ *G06F 3/013* (2013.01); *G02B 2027/014* (2013.01); *G02B 2027/0178* (2013.01); *G02B 2027/0185* (2013.01)

(58) Field of Classification Search
CPC .......... G02B 27/0179; G02B 2027/014; G02B 2027/0178; G02B 2027/0181; G02B 2027/0185; G02C 7/02; G02C 7/022; G02C 7/027; G02C 7/06–7/068; G09G 3/002; G09G 3/003; G09G 3/2003; G09G 3/32; G09G 3/3208; G09G 3/34; G09G 3/36; G09G 5/003; G09G 2320/02; G09G 2320/0233; G09G 2320/0242; G09G 2320/0257; G09G 2320/028; G09G 2320/04; G09G 2320/041; G09G 2320/06; G09G 2320/0626; G09G 2320/066; G09G 2320/0666; G09G 2320/068; G09G 2320/0686; G09G 2320/0693; G09G 2320/10–106; G09G 2340/04–2340/0428; G09G 2340/0464–2340/0485; G09G 2340/10; G09G 2340/12; G09G 2340/145; G09G 2354/00; G09G 2380/08
See application file for complete search history.

(56) References Cited

U.S. PATENT DOCUMENTS

| | | |
|---|---|---|
| 2010/0091027 A1 | 4/2010 | Oyama et al. |
| 2014/0327604 A1 | 11/2014 | Oyama et al. |
| 2015/0235427 A1* | 8/2015 | Nobori ................ G02B 27/017 345/629 |
| 2015/0355481 A1 | 12/2015 | Hilkes et al. |
| 2016/0216515 A1* | 7/2016 | Bouchier .............. G06T 19/006 |
| 2016/0260258 A1* | 9/2016 | Lo .......................... G09G 5/363 |

* cited by examiner

METHOD FOR MANAGING THE DISPLAY OF AN IMAGE TO A USER OF AN OPTICAL SYSTEM

FIELD OF THE INVENTION

The invention relates to a display managing method and corresponding component for managing the display of an image to a user of a see-through displaying device arranged and configured to display the image towards an eye of the user. The invention further refers to an optical see-through displaying device and a head mounted optical see-through displaying device configured to be worn by a user comprising such a display managing component.

BACKGROUND OF THE INVENTION

A head-mounted system (HMD) is an electro-optical device worn on the head by a wearer. Usually such system is electronically controlled so as to switch between different stages or to display information to the wearer. A head mounted system usually presents like a spectacle frame with electronically controlled spectacle lenses.

The present invention is concerned with head-mounted system used according to various usage pattern such as non-immersive head-mounted system that allow the wearer to interact with their environment while using the head-mounted system or immersive head-mounted system that cuts off the field of outside view.

More particularly, the present invention is concerned with head-mounted system comprising a see-around or see-through mechanism.

Head-mounted see-through display systems are capable of superimposing information, for example computer generated information, over the real-world view. Such head-mounted see-through display systems are used in particular for realizing augmented reality.

There is a need to provide an optical device adapted to a wearer or a group of wearers, in particular adapted to their lifestyle, their visual needs and/or their requests in a simply manner, with a modular approach if necessary and preferably in a late step of the manufacturing of the optical device in order to limit the unit production cost.

In the example of a head mounted display systems, there is a need to customize such system to the wearer's viewing ability since, the wearer sees the real-world through it. If the wearer needs corrective ophthalmic lenses to see the real world correctly, the head mounted see-through system should be adapted to such requirements.

Therefore, there is a need to provide an optical device, for example a head-mounted see-through system, adapted to a wearer or a group of wearers and in particular to a wearer's prescription.

The wearer's prescription is a set of optical characteristics of optical power, of astigmatism and, where relevant, of addition, determined by an ophthalmologist or an optometrist in order to correct the vision defects of the wearer, for example by means of a lens positioned in front of his eye. For example, the prescription for a progressive addition lens comprises values of optical power and of astigmatism at the distance-vision point and, where appropriate, an addition value.

Therefore, it is an object of the present invention to provide an optical device comprising an emitting system adapted to a wearer visual needs, whether it is wearer's prescription or other visual needs such a light attenuation, color perception, glare protection, visual comfort improvement.

SUMMARY OF THE INVENTION

To this end, the invention proposes a display managing method for managing the display of an image to a user of an optical system comprising at least a see-through displaying device arranged and configured to display the image towards an eye of the user and an optical lens designed to be placed in front of the eye of the user and having an optical function, the method comprises:
  an optical function data providing step, during which optical function data relating to the optical function of the optical lens is provided; and
  a display parameter determining step, during which a value of at least one display parameter is determined based at least on the optical function data.

Advantageously, the display managing method according to the invention allows optimizing the use of an optical system comprising at least a see-through displaying device and improving the visual comfort of the wearer when he looks at a virtual image displayed by the optical system.

According to further embodiments which are compatible with the previous one and can be considered alone or in combination:
  the optical function data comprise at least dioptric function data relating to a dioptric function based at least on an ophthalmic correction adapted to the user;
  the dioptric function data relate to a progressive multifocal optical design;
  the at least one display parameter comprises the position of the image and/or angular extent of the image and/or the projection distance of the image;
  the see-through displaying device comprises at least a tracking component adapted to determine the gazing direction of at least the eye of the user towards which the image is displayed and the method further comprises a gazing direction determining step during which the gazing direction of the eye of the user is determined, and during the display parameter determining step, the value of at least one display parameter is further determined according to the determined gazing direction;
  the display managing method further comprises a zone of interest identification step, during which at least one zone of interest of the optical lens is identified based on the optical function data relating to the optical function of the optical lens and the value of at least one display parameter is further determined based on the at least one zone of interest during the display parameter determining step;
  the at least zone of interest comprises a near distance vision zone adapted for near distance vision and/or a far distance vision zone adapted for far distance vision and/or an intermediate distance vision zone adapted for intermediate distance vision and/or a distortion zone and/or an aberration zone;
  the image to be displayed towards the eye of the user comprises a plurality of sub-images and during the display parameter determining step, a value of at least one display parameter for each sub-image of the plurality of sub-images is determined based on the at least one zone of interest;
  the gazing direction is determined over the time and at least one distortion and/or aberration zone is identified and the value of at least one display parameter is updated based on the evolution over time of the gazing direction so as to display the image in the gazing direction avoiding the at least one distortion and/or aberration zone;

the display managing method further comprises an activity data providing step, during which activity data indicative of an activity of the user are provided and the value of at least one display parameter is further determined based on the activity data during the display parameter determining step.

Another object of the invention relates to a display managing component for managing the display of an image to a user of an optical system comprising at least a see-through displaying device arranged and configured to display the image towards an eye of the user and an optical lens designed to be placed in front of the eye of the user and having an optical function, the display managing component comprising:

a memory configured to store computer executable instructions, and a processor for executing the computer executable instructions stored in the memory, wherein the computer executable instructions comprises instructions for:

providing optical function data relating to the optical function of the optical lens, and determining a value of at least one display parameter based on at least on the optical function data.

According to an embodiment, the computer executable instructions comprise one of the following instructions for:

determining the gazing direction of the eye of the user, and wherein the value of at least one display parameter is further determined according to the determined gazing direction, and/or identifying at least one zone of interest of the optical lens based on the optical function data relating to the optical function of the optical lens, and wherein the value of at least one display parameter is further determined based on the at least one zone of interest, and/or providing an activity data indicative of an activity of the user, and wherein the value of at least one display parameter is further determined based on the activity data during the display parameter determining step.

Another object of the invention relates to an optical see-through displaying device comprising:

a display device configured to display an image to a user, and a display managing component configured to manage the display of the image according to the invention.

The invention further relates to a head mounted optical see-through displaying device configured to be worn by a user, comprising:

a see-through displaying device arranged and configured to display the image towards an eye of the user, an optical lens designed to be placed in front of the eye of the user and having an optical function, and a display managing component configured to manage the display of the image according to the invention.

The invention also relates to a computer program product comprising one or more stored sequences of instructions that are accessible to a processor and which, when executed by the processor, causes the processor to carry out at least the steps of the method according to the invention.

The invention also relates to a computer-readable storage medium having a program recorded thereon; where the program makes the computer execute at least the steps of the method of the invention.

The invention further relates to a device comprising a processor adapted to store one or more sequence of instructions and to carry out at least steps of the method according to the invention.

Unless specifically stated otherwise, as apparent from the following discussions, it is appreciated that throughout the specification discussions utilizing terms such as "computing", "calculating", or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Embodiments of the present invention may include apparatuses for performing the operations herein. This apparatus may be specially constructed for the desired purposes, or it may comprise a general purpose computer or Digital Signal Processor ("DSP") selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs) electrically programmable read-only memories (EPROMs), electrically erasable and programmable read only memories (EEPROMs), magnetic or optical cards, or any other type of media suitable for storing electronic instructions, and capable of being coupled to a computer system bus.

The methods and displays presented herein are not inherently related to any particular computer or other apparatus. Various general purpose systems may be used with programs in accordance with the teachings herein, or it may prove convenient to construct a more specialized apparatus to perform the desired method.

The desired structure for a variety of these systems will appear from the description below. In addition, embodiments of the present invention are not described with reference to any particular programming language. It will be appreciated that a variety of programming languages may be used to implement the teachings of the inventions as described herein.

BRIEF DESCRIPTION OF THE DRAWINGS

Other characteristics and advantages of the invention will become more apparent from the claims and from the following description of some embodiments given by way of example without limitation with reference to the drawings, in which:

Elements in the figures are illustrated for simplicity and clarity and have not necessarily been drawn to scale. For example, the dimensions of some of the elements in the figure may be exaggerated relative to other elements to help improve the understanding of the embodiments of the present invention.

DETAILED DESCRIPTION OF PREFERRED EMBODIMENTS

Figure 1:
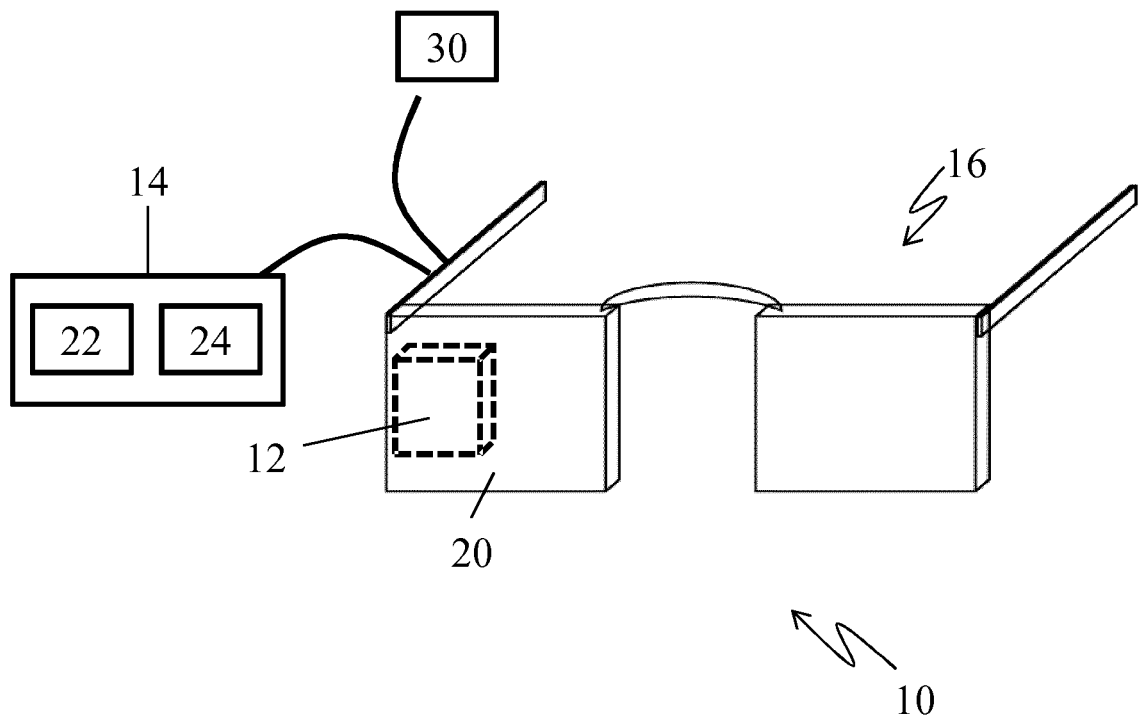
FIG. 1 is a schematic representation of a head mounted device according to the invention.

As illustrated on FIG. 1, the invention relates to an optical see-through displaying device 10 comprising a display device 12 configured to display an image to a user and a display managing component 14 configured to manage the display of the image according to the invention.

For example and as illustrated in FIG. 1, the optical see-through displaying device 10 is embedded in a head mounted optical see-through displaying device 16 configured to be worn by a user.

Thus, the see-through displaying device is arranged and configured to display the image towards an eye of the user of the head mounted device (HMD).

For example, the display device 12 comprises a display source (not illustrated), a collimating source (not illustrated) and a light conducting element (not illustrated). The light conducting element is configured to output a supplementary light through an exit face of said light conducting element towards an eye of the wearer. For example, the light conducting element can be a light-guide optical element (LOE).

Such display system allows a two-dimensional image source to be imaged to infinity or not and reflected towards the eye of the wearer.

More precisely, the optical see-through display device 10 allows the user to interact with its environment while displaying information to the user. The device displays an image of the environment of the user with augmented reality based on a source image.

The head mounted device 16 also comprises at least an optical lens 20 designed to be placed in front of the eye of the user and having an optical function. Of course, the head mounted device 16 can comprises a pair of optical lenses, each being designed to be placed in front of one eye of the user and having an optical function.

In the sense of the invention, the optical function corresponds to a function providing for each gaze direction the effect of the optical lens on the light ray passing through the optical lens.

The optical function may comprise as dioptric function, light absorption, polarizing capability, reinforcement of contrast capacity, etc. . . .

The dioptric function corresponds to the optical lens power (mean power, astigmatism etc. . . . ) as a function of the gaze direction.

The display managing component 14 according to the invention will now be detailed. More particularly, the display managing component 14 is configured to manage the display of an image to the user of an optical system comprising at least the see-through displaying device 10 and the optical lens 20.

To this end, the display managing component 14 comprises a memory 22 configured to store computer executable instructions and a processor 24 for executing the computer executable instructions stored in the memory.

Furthermore, the computer executable instructions comprises instructions for implementing a method for managing the display of the optical see-through displaying device 10 according to the invention. Such method will be detailed hereinafter.

The computer executable instructions comprises at least instructions for providing optical function data relating to the optical function of the optical lens, and for determining a value of at least one display parameter based on at least on the optical function data.

According to an embodiment, the computer executable instructions further comprises instructions for determining the gazing direction of the eye of the user, and wherein the value of at least one display parameter is further determined according to the determined gazing direction.

According to another embodiment compatible with the previous one, the computer executable instructions further comprises instructions for identifying at least one zone of interest of the optical lens based on the optical function data relating to the optical function of the optical lens.

The value of at least one display parameter is further determined based on the at least one zone of interest.

According to another embodiment compatible with the previous ones, the computer executable instructions further comprises instructions for providing an activity data indicative of an activity of the user, and wherein the value of at least one display parameter is further determined based on the activity data during the display parameter determining step.

Figure 2:
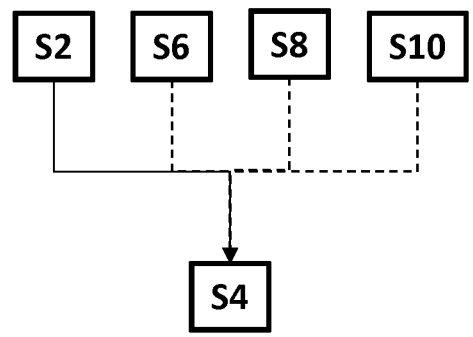
FIG. 2 is a general flow chart of an embodiment of the display managing method according to the invention.

The display managing method according to the invention will now be tailed with reference to FIG. 2.

The display managing method according to the invention is destined to manage the display of the image to the user of the optical system comprising at least the see-through displaying device 10 and at least one optical lens 20. As indicated hereinbefore, the see-through displaying device 10 is arranged and configured to display the image towards an eye of the user and the optical lens 20 is designed to be placed in front of the eye of the user and has an optical function.

The method comprises:

an optical function data providing step S2, and a display parameter determining step S4.

During the optical function data providing step S2, optical function data relating to the optical function of the optical lens are provided.

As indicated hereinbefore, the optical function corresponds to a function providing for each gaze direction the effect of the optical lens on the light ray passing through the optical lens.

The optical function may comprise as dioptric function, light absorption, polarizing capability, reinforcement of contrast capacity, etc. . . .

Preferably, the optical function data comprise at least dioptric function data relating to a dioptric function based at least on an ophthalmic correction adapted to the user.

The dioptric function corresponds to the optical lens power (mean power, astigmatism etc. . . . ) as a function of the gaze direction.

For example, the dioptric function data relate to a progressive multifocal optical design.

The wording "optical design" is a widely used wording known from the man skilled in the art in ophthalmic domain to designate the set of parameters allowing to define a dioptric function of an ophthalmic lens; each ophthalmic lens designer has its own designs, particularly for progressive ophthalmic lenses. As for an example, a progressive ophthalmic lens "design" results of an optimization of a progressive surface so as to restore a presbyope's ability to see clearly at all distances but also to optimally respect all physiological visual functions such as foveal vision, extra-foveal vision, binocular vision and to minimize unwanted astigmatisms. For example, a progressive lens design comprises:

a power profile along the main gaze directions (meridian line) used by the lens wearer during day life activities, distributions of powers (mean power, astigmatism, . . . ) on the sides of the lens, that is to say away from the main gaze direction.

These optical characteristics are part of the "designs" defined and calculated by ophthalmic lens designers and that are provided with the progressive lenses.

During the display parameter determining step S4, a value of a display parameter is determined based at least on the optical function data. Of course, a value of a plurality of display parameters can be determined based at least on the optical function data during the display parameter determining step S4.

Preferably, at least one display parameter determined during step S4 is at least chosen among the list consisting of:
the position of the image,
angular extent of the image, and
the projection distance of the image.

Of course, other display parameters can be further determined during step S4 based at least on the optical function data.

According to a first embodiment, the see-through displaying device 10 comprises at least a tracking component 30. Such tracking component 30 is adapted to determine the gazing direction of at least the eye of the user towards which the image is displayed.

In this embodiment, the method further comprises a gazing direction determining step S6 during which the gazing direction of the eye of the user is determined.

Then, during the display parameter determining step S4, the value of at least one display parameter is further determined according to the determined gazing direction.

According to a second embodiment compatible with the first one, the method further comprises a zone of interest identification step S8, during which at least one zone of interest of the optical lens is identified based on the optical function data relating to the optical function of the optical lens.

For example, the optical lens can be a progression addition lens and consequently comprises a near distance vision zone, a far distance vision zone and an intermediate distance vision zone, each being adapted correspondingly for near distance vision, far distance vision and intermediate distance vision. Each of these zones can be identified as a zone of interest.

According to another example, the identified zone of interest can correspond to a distortion zone and/or an aberration zone.

Then, the value of at least one display parameter is further determined based on the at least one identified zone of interest during the display parameter determining step.

According to a preferred embodiment, the image to be displayed towards the eye of the user comprises a plurality of sub-images. Thus, a value of the or each display parameter for each sub-image of the plurality of sub-images is determined based on the at least one zone of interest during the display parameter determining step S4.

Thus, the invention allows taking into account the zones of interest, and more particularly, the distortion zone and/or an aberration zone in order to place the virtual information in these zones because they are not used to see-trough vision if the wearer wants to promote the vision of the real scene.

On the contrary, the "secondary" information, for example warning information, can only be displayed in these zones in order to display the "essential" information, which requires a high definition in the attention zone of the user.

Moreover, when the see-through displaying device 10 further comprises a tracking component 30 adapted to determine the gazing direction of at least the eye of the user towards which the image is displayed, the gazing direction can be advantageously determined over the time. Then, the value of the or each display parameter can also be updated based on the evolution over time of the gazing direction so as to display the image in the gazing direction avoiding the identified zones of interest if the identified zones of interest are distortion and/or aberration zone.

Advantageously, the virtual image is thus always displayed in the gazing direction of the user but favoring or prohibiting the zones of distortion or aberration of the progressive lens. Thus, specific zones causing a visual discomfort of the user can be avoided.

According to a third embodiment compatible with the previous ones, the method further comprises an activity data providing step S10, during which activity data indicative of an activity of the user are provided. The value of the or each display parameter is advantageously further determined based on the activity data during the display parameter determining step.

Activity data can be measured by sensors placed on the frame, like accelerometers, gyroscope, light sensors, distance sensors, cameras. Detected activity can be for example reading a book or a portable device, watching TV, driving a car, running or walking. All these activities can require different display methods to improve the user comfort.

According to the activity of the user, for example displacement, the image can be displayed preferably in the near distance vision zone or in the far distance vision zone.

The invention claimed is:

1. A display managing method for managing the display of an image to a user of an optical system comprising at least a see-through displaying device arranged and configured to display the image towards an eye of the user and an optical lens designed to be placed in front of the eye of the user and having an optical function, the method comprises:
    an optical function data providing step including providing optical function data relating to the optical function of the optical lens;
    a zone of interest identification step including identifying at least one zone of interest of the optical lens based on the optical function data relating to the optical function of the optical lens;
    a display parameter determining step including determining a value of at least one display parameter based at least on the optical function data and on at least one zone of interest; and
    wherein the image to be displayed towards the eye of the user comprises a plurality of sub-images and wherein during the display parameter determining step, a value of at least one display parameter for each sub-image of the plurality of sub-images is determined based on the at least one zone of interest.

2. The display managing method according to claim 1, wherein the optical function data comprise at least dioptric function data relating to a dioptric function based at least on an ophthalmic correction adapted to the user.

3. The display managing method according to claim 2, wherein the dioptric function data relate to a progressive multifocal optical design.

4. The display managing method according to claim 1, wherein the at least one display parameter comprises the position of the image and/or angular extent of the image and/or the projection distance of the image.

5. The display managing method according to claim 1, wherein the see-through displaying device comprises at least a tracking component adapted to determine the gazing direction of at least the eye of the user towards which the image is displayed and wherein the method further comprises a gazing direction determining step including determining the gazing direction of the eye of the user, and during the display parameter determining step, further determining the value of at least one display parameter according to the determined gazing direction.

6. The display managing method according to claim 5, wherein the gazing direction is determined over the time and at least one distortion and/or aberration zone is identified and the value of at least one display parameter is updated based on the evolution over time of the gazing direction so as to display the image in the gazing direction avoiding the at least one distortion and/or aberration zone.

7. The display managing method according to claim 5, further comprises an activity data providing step including providing activity data indicative of an activity of the user and further determining the value of at least one display parameter based on the activity data during the display parameter determining step.

8. A display managing component for managing the display of an image to a user of an optical system comprising at least a see-through displaying device arranged and configured to display the image towards an eye of the user and an optical lens designed to be placed in front of the eye of the user and having an optical function, the display managing component comprising:
a memory configured to store computer executable instructions, and
a processor for executing the computer executable instructions stored in the memory, wherein the computer executable instructions comprises instructions for:
providing optical function data relating to the optical function of the optical lens, identifying at least one zone of interest of the optical lens based on the optical function data relating to the optical function of the optical lens,
determining a value of at least one display parameter based on at least on the optical function data and on at least one zone of interest; and
wherein the image to be displayed towards the eye of the user comprises a plurality of sub-images and wherein during the display parameter determining step, a value of at least one display parameter for each sub-image of the plurality of sub-images is determined based on the at least one zone of interest.

9. A display managing component according to claim 8, wherein the computer executable instructions comprises one of the following instructions for:
determining the gazing direction of the eye of the user, and wherein the value of at least one display parameter is further determined according to the determined gazing direction, and/or
providing an activity data indicative of an activity of the user, and wherein the value of at least one display parameter is further determined based on the activity data during the display parameter determining step.

10. An optical see-through displaying device comprising:
a display device configured to display an image to a user, and
a display managing component configured to manage the display of the image according to claim 8.

11. A head mounted optical see-through displaying device configured to be worn by a user, comprising:
a see-through displaying device arranged and configured to display the image towards an eye of the user,
an optical lens designed to be placed in front of the eye of the user and having an optical function, and
a display managing component configured to manage the display of the image according to claim 8.

* * * * *